United States Patent [19]

McInnis

[11] Patent Number: 5,277,712

[45] Date of Patent: Jan. 11, 1994

[54] DRY MIX-TYPE JOINT COMPOUNDS, COMPOSITIONS THEREFROM AND METHODS FOR FILLING DRYWALL JOINTS WITH SAME

[75] Inventor: John D. McInnis, Nova Scotia, Canada

[73] Assignee: Louisiana-Pacific Corporation, Hayden Lake, Id.

[21] Appl. No.: 932,648

[22] Filed: Aug. 20, 1992

[51] Int. Cl.$^5$ .............................................. C04B 11/00
[52] U.S. Cl. ................................. 106/774; 106/778; 106/780; 106/785; 106/DIG. 2
[58] Field of Search ........... 106/819, 822, 823, DIG.2, DIG.4; 106/774; 778; 780; 785

[56] References Cited

U.S. PATENT DOCUMENTS

| | | | |
|---|---|---|---|
| Re. 29,753 | 9/1978 | Williams | 106/780 |
| 3,891,453 | 6/1975 | Williams | 106/780 |
| 3,905,826 | 9/1975 | Ordonez et al. | 106/823 |
| 4,286,995 | 9/1981 | Smith et al. | 106/774 |
| 4,306,911 | 12/1981 | Gordon et al. | |

FOREIGN PATENT DOCUMENTS

| | | |
|---|---|---|
| 0081265 | 6/1983 | European Pat. Off. |
| 0225036 | 6/1987 | European Pat. Off. |
| 0343148 | 11/1989 | European Pat. Off. |

OTHER PUBLICATIONS

Chemical Abstracts, vol. 94, 1981, Columbus, Ohio, US; abstract No. 51914z, J. Balslev et al., 'polypropylene fibers for reinforcing construction material' p. 297.

*Primary Examiner*—Mark L. Bell
*Assistant Examiner*—Paul Marcantoni
*Attorney, Agent, or Firm*—Marger, Johnson, McCollom & Stolowitz

[57] ABSTRACT

A dry mix-type, drywall panel joint compound is produced which comprises (a) a fine plaster which is applied to a joint formed between adjacent drywall panels in the plastic state to form a hardened material, (b) a material which imparts internal strength and workability to the joint compound, (c) a material for retaining water and inhibits shrinkage of the joint compound within the joint formed between adjacent drywall panels, and (d) a set time control agent. The more preferred joint compound formulation of this invention includes (a) stucco, (b) methyl cellulose, and (c) perlite. A longer set time version of the subject dry mix-type, drywall panel joint compound can also be provided which comprises, in addition to (a)–(d), (e) at least one water absorption agent, (f) at least one shrinkage and cracking inhibitor, (g) at least one adhesive strengthening agent, and (h) an alkaline material for raising the pH of material. The more preferred longer set time joint compound formulation comprises (e) mica, (f) bentonite clay, (g) vinyl acetate and/or vinyl alcohol, and (h) calcium hydroxide.

26 Claims, No Drawings

DRY MIX-TYPE JOINT COMPOUNDS, COMPOSITIONS THEREFROM AND METHODS FOR FILLING DRYWALL JOINTS WITH SAME

BACKGROUND OF THE INVENTION

This invention relates generally to certain gypsum-based, dry mix-type joint compounds, to compositions employing these dry mix-type joint compounds, to methods for applying the subject compositions in filling and finishing the joint formed between adjacent drywall panels.

As described in U.S. Pat. No. 5,079,042, drywall or gypsum board is used in the form of panels for interior walls of buildings, and has largely replaced plaster in both commercial and residential construction. Thus, commercial drywall panels which are 4'×8', 4'×9' or 10'×12' in size, but can be up to 8'×24', are nailed to wood studs with their longer dimension positioned horizontally.

U.S Pat. No. 5,041,333 discloses a continuous process for the producing of exemplary drywall panels or gypsum board. These boards are of variable yet predictable density, wherein a fibrous form of stucco produced from gypsum crystals of fibers is combined with standard calcined gypsum and formed into the board. The density of the resultant board varies inversely with the content of fibrous stucco. The process yields lightweight board suitable as standard wallboards and inorganic insulating boards.

U.S. Pat. No. 4,126,599 discloses a water-resistant shaped gypsum panel comprising (A) calcium sulfate dihydrate formed by hardening of calcium sulfate capable of hydration reaction, (B) a calcium type filler for filling up spaces among crystalline particles of said calcium sulfate dihydrate and (C) a water-insoluble or hardly water-soluble salt of a polybasic acid having a second stage dissociation constant of $10^{-3}$ to $10^{-10}$, especially $10^{-4}$ to $10^{-9}$, as measured at 25 deg. C.

U.S. Pat. No. 4,174,230 discloses a gypsum composition comprising: (A) a lightweight spherical gypsum and (B) at least one binder selected from the group consisting of a water-soluble organic polymer, a water-dispersible organic polymer, a water-soluble inorganic compound, a water-dispersion medium colloid forming inorganic compound, a water-hardenable compound and a mixture thereof. This gypsum composition provides a gypsum molded product which is lightweight and, at the same time, has great mechanical strength.

U.S. Pat. No. 4,350,533 discloses a rapid reaction of high alumina cement, gypsum, lime and water produces hydraulic cementitious compositions in which the only significant factor contributing to strength during the very early stages of hydration (i.e., a few minutes to a few hours) is the formation of an amount of ettringite equal to from about 40% to about 60% of the weight the paste of water, the high alumina cement, the gypsum source, and the lime source. A substantially impermeable concrete having a 4-hour compressive strength of about 8000 p.s.i. may be produced from the cement powder of this invention.

U.S Pat. No. 4,560,413 discloses a hardened cement material having enhanced flexural strength, heat resistance, and water resistance prepared from a cement composition. The cement composition comprises 100 parts by weight of a hydraulic cement material containing $\gamma$-dicalcium silicate ($\gamma$-$C_2S$), preferably in an amount of 1% by weight or more, and 1 to 20 parts by weight of a water-dispersible polymeric material. The cement composition is mixed with 5 to 25 parts by weight of water by a molding procedure and by a heat-hardening procedure at a temperature of 40 degrees C. to 180 degrees C. while controlling the relative humidly to 20% to % and/or applying a pressure of 5 to 15 atmospheres.

U.S. Pat. No. 4,729,853 discloses a flame-retarding sealing compounds based on hydraulic binders. The sealing compounds include hydraulic binders such as gypsum, dehydratable aluminum fillers and melamines.

U.S. Pat. No. 4,746,365 this invention relates to improved aluminous cement/gypsum compositions that contain polymer latex emulsions or compounds to produce self-curing, crack-free, fast-setting, high early strength, high bonding, water resistant, durable, cementitious mixtures for finishing, coating, plastering, stucco, rigid insulation protection, topping, resurfacing, patching, mortaring, tile grouting, concrete, and the like.

U.S. Pat. No. 4,846,889 discloses a polymer blend useful in thin-bed mortar compositions comprising a water-soluble cellulose ether and a water-insoluble, but water-dispersible, polymer. The water insoluble, but water-dispersible polymer can include an unneutralized polyacrylic acid that is lightly crosslinked or methylcellulose with a viscosity from about 50 cps to about 150,000 cpa, provided the polymeric blend containing methylcellulose is employed in a medium that has a pH of about 12 or greater, although a pH of less than 12 is workable, but is dependent upon the methoxyl content of the methylcellulose. The polymeric blend extends the working time of the composition in which it is employed.

The joint between the adjacent horizontal edges of two adjacent gypsum or drywall panels located one above the other must be filled with an appropriate joint compound in order to hide the joint between the two panels and to develop a flat wall surface from the floor to the ceiling. Gypsum-based dry mix type joint compounds have been used successfully in Europe for many years to fill and finish such joints. This is contrary to the North American practice of using paper or fiberglass tape on all drywall seams and angles.

U.S. Pat. No. 5,079,024 discloses a system for finishing the joint between abutting panels of drywall by applying a joint compound comprising mostly gypsum plaster together with (a) fillers such as limestone, mica, and perlite, (b) binders such as clay, natural starch, synthetic starch, CMC and vinyl binders, and (c) a small amount of acrylic monofilament fibers which are about 4 mm to 10 mm longer.

However, it has determined that the joint compound manufactured by the assignee of U.S. Pat. No. 5,079,024, Solid Products, Inc., under hot and dry atmospheric conditions will shrink substantially, and will exhibit substantially reduced flexural strength.

Accordingly, a need remains for dry mix-type joint compounds and compositions therefrom which, when applied in a drywall panel joint, exhibit high flexural strength, minimum shrinkage, and substantially no visible cracking under very hot and dry surrounding atmospheric conditions.

SUMMARY OF THE INVENTION

The above-described need has now been met by the dry mix-type, drywall panel joint compounds and compositions therefrom produced according the present invention. When the joint compounds and compositions are applied in a drywall panel joint, they exhibit high flexural strength (at least 50 lbs/lineal inch), minimum shrinkage, and substantially no visible cracking under very hot and dry surrounding atmospheric conditions. Therefore, the joint compounds of the subject invention can unexpectedly be employed as described above in vertical and/or horizontal joints in either steel stud or wood frame construction. The subject joint compounds and compositions were tested under hot and dry conditions. More particularly, a test area was maintained at 105 degrees F. and 30% relative humidity ("RH") so that the joint compound performance could be evaluated under adverse atmospheric conditions.

The dry mix-type, drywall panel joint compound of the present invention comprises (a) a fine plaster which is applied to a joint formed between adjacent drywall panels in the plastic state to form a hardened material; (b) a material which imparts internal strength and workability to the joint compound; (c) a material for retaining water and inhibits shrinkage of the joint compound within the joint formed between adjacent drywall panels; and (d) a set time control agent.

The fine plaster denoted material (a) is preferably stucco, a material generally made mainly of calcium sulfate hemihydrate ($CaSO_4 \frac{1}{2}H_2O$). The fine plaster is applied in a plastic state to form a hardened permanent structure.

The material which imparts internal strength and workability to the joint compound, denoted material (b), is preferably an alkyl cellulose, more preferably methyl hydroxyl ethyl cellulose. Material (b) allows the worker who is applying the joint composition in its plastic state to more easily and effectively smooth same to facilitate finishing of the joint compound within the joint formed between adjacent drywall panels. The preferred methyl cellulose material is C8590 manufactured by Aqualon Gmbh.

The material for retaining water to prevent premature drying and minimizing shrinkage of the joint compound within the joint formed between adjacent drywall panels, denoted material (c), preferably comprises perlite. The joint compound of this invention is preferably formulated so that it undergoes shrinkage, as hereinafter defined, of not more than about 2 mm. Perlite is a volcanic glass that has a concentric shelly structure, appears as if composed of concretions, and is usually grayish and sometimes spherulitic. When perlite is expanded by heat it forms a lightweight aggregate. Preferably, a high surface area perlite having a surface area of at least about 1.0 $m^2/g$, more preferably at least about 1.5 $m^2/g$, and most preferably at least about 2.0 $m^2/g$, is employed. An example of such a high surface area perlite is the FF56 grade material from Grefco.

The set time of the dry mix-type, drywall panel joint compound is typically up to about 180 minutes, and preferably either a shorter set time of up to about 60 minutes, or a longer set time of more than about 60 minutes up to about 180 minutes. A set time control agent, denoted material (d) is employed for this purpose. The preferred set time control agent comprises an N poly(oxymethylyene)-amino butanoic acid.

The shorter set time dry mix-type, drywall panel joint compound preferably comprises from about 80 to 98 weight % of (a) the fine plaster, from about 0.5 to 6 weight % of (b) the material which imparts internal strength and workability to the joint compound, from about 0.5 to 10 weight % of (c) the material for retaining water and inhibits shrinkage of the joint compound within the joint formed between adjacent drywall panels, and from about 0.01 to 5 weight % of (d) the set time control agent. All of the weight % of (a) thru (d) being based on the total weight of the joint compound. The more preferred shorter time joint compound formulation of this invention comprises from about 90 to 96 weight % of (a) stucco; from about 1 to 5 weight % of (b) methyl cellulose; from about 1 to 5 weight % of (c) perlite; and from about 0.05 to 1 weight % of (d) a set time control agent, all of weight % of (a) thru (d) being based on the total weight of the joint compound.

In the longer set time compound, in addition to materials (a)-(d), dry mix-type, drywall panel joint compound further comprises (e) at least one water absorption agent, (f) at least one shrinkage and cracking inhibitor, (g) at least one adhesive strengthening agent, and (h) an alkaline material for raising the pH of material (b). Preferably, material (e) comprises mica, i.e., any of various colored or transparent mineral silicates crystallizing in monoclinic forms that readily separate into very thin leaves, and/or bentonite, i.e., an absorptive and colloidal clay compound as hereinafter described, materials (f) and (g) comprise vinyl acetate and vinyl alcohol, and material (h) comprises calcium hydroxide.

The longer set time dry mix-type, drywall panel joint compound may, in addition to (a)-(d), preferably comprises from about 0.1 to 8 weight % of (e) at least one water absorption agent; from about 0.1 to 4 weight % of (f) at least one shrinkage and cracking inhibitor; from about 0.1 to 8 weight % of (g) at least one adhesive strengthening agent; from about 0.01 to 5 weight % of (h) an alkaline material for raising the pH of material, all of weight % of (a) thru (h) being based on the total weight of said compound. The more preferred longer set time joint compound formulation comprises, in addition to (a)-(d), from about 0.1 to 3 weight % of (e) mica; from about 0.1 to 3 weight % of (f) bentonite clay; from about 0.1 to 5 weight % of (g) vinyl acetate and/or vinyl alcohol; from about 0.1 to 1 weight % of (h) calcium hydroxide, all of weight % of (a) thru (h) being based on the total weight of the joint compound.

A shorter set time drywall panel joint composition of the present invention is also provided which comprises materials (a)-(d), as described above, and (e) water. The preferred amounts of each material (a)-(e) in the subject composition is as follows: from about 40 to 60 weight % of (a) the fine plaster, from about 0.25 to 3 weight % of (b) the material which imparts internal strength and workability to the joint compound, from about 0.25 to 5 weight % of (c) the material for retaining water and inhibits shrinkage of the joint compound within the joint formed between adjacent drywall panels, 0.005 to 2.5 weight % of (d) the set time control agent, and from about 35 to 50 weight % of water. All of the weight % of (a) thru (d) and water being based on the total weight of the joint compound. The more preferred shorter time joint compound formulation of this invention includes (a) stucco, (b) methyl cellulose, and (c) perlite.

The longer set time dry mix-type, drywall panel joint compound additionally preferably comprises from about 0.1 to 8 weight % of (e) at least one water absorption agent; from about 0.1 to 4 weight % of (f) at least one shrinkage and cracking inhibitor; from about 0.1 to 8 weight % of (g) at least one adhesive strengthening agent; from about 0.01 to 5 weight % of (h) an alkaline material for raising the pH of material, all of weight % of (a) thru (h) being based on the total weight of said compound. The more preferred longer set time joint compound formulation comprises, in addition to (a)-(d), (e) mica, (f) bentonite, g) vinyl acetate and/or vinyl alcohol and (h) calcium hydroxide.

To facilitate the prevention of shrinkage and cracking, synthetic polymeric fibrous material, preferably in the form of monofilaments, may be added to the joint compound formulation. In the most preferred form, 0.01 to 1 % by weight of fiberglass monofilaments can be added to joint compound formulation.

The foregoing and other objects, features and advantages of the invention will become more readily apparent from the following detailed description of a preferred embodiment of the invention which proceeds with reference to the accompanying drawings.

DETAILED DESCRIPTION OF A PREFERRED EMBODIMENT

Example

The following formulation (in parts) was employed to make a drywall joint composition having a set time of 30 to 60 minutes:

| | |
|---|---|
| 96 | Stucco |
| 4 | Methyl Cellulose (C8590 from Aqualon) |
| 4 | Perlite (FF 56 grade from Grefco) |
| 0.18 | Retardan 40/60 (stucco(60)/calcium salt of butanoic acid(40) from Tricosal) |

The drywall joint composition was prepared in a batch mixture by introducing 1200 lbs of Stucco, 50 lbs of Perlite, 50 lbs of Methyl Cellulose, and 2.2 lbs. of Retardan 40/60 into a 4000 lb. capacity blender manufactured by M-Tec under the following mixing conditions. The materials were mixed for 10 minutes at approximately 100 to 150 rpm.

The following formulation (in parts) was employed to make a 90 to 120 minute set time drywall joint composition:

| | |
|---|---|
| 93 | Stucco |
| 3 | Mica 5290 (St. Lawrence Chemical) |
| 2 | Bentonite (Accugel-F from American Colloid) |
| 2 | Methyl Cellulose (MHEC 6000 from Aqualon) |
| 1 | Vinyl Acetate (RP 251 from Air Products) |
| 1 | Vinyl Alcohol (Airvol from Air Products) |
| 0.5 | Ca(OH)$_2$ |
| 0.6 | Butonoic Acid Mat'l (Retardan 40/60 from Tricosal) |

The longer set time joint compound was mixed by adding 1150 lbs. of Stucco, 24.7 lbs. Perlite, 37.0 lbs. of mica, 24.7 lbs. of Bentonite, 12.3 lbs. of Vinyl Acetate, 12.3 lbs of Vinyl Alcohol, 24.7 lbs. of Methyl Cellulose, 6.2 lbs. of Ca(OH)2, and 7.4 lbs. of Retardan 40/60 were added to the aforementioned 4000 lb. blender from M-Tec. The materials were mixed for ten minutes at approximately 100 to 150 rpm.

Here is a summary of the test results on both of the above-described shorter and longer set time products. The procedure employed for conducting joint strength testing is as follows:

1. Samples of profiled, knife and butt joints are cut to 2" wide×5" long. All profiled edges are edge sealed with two dry mils of the appropriate edge sealer.
2. Four pairs of samples are clamped in the test frame opposing each other. Profiled edges are butted tightly together. Butt edges are either knife cut or machine cut so that they are gaped ⅛" to ¼" apart.
3. The joint compound to be tested is applied to the joint using shorter strokes perpendicular to the direction of the joint.
4. After making sure the joint has been completely filled, any excess compound is removed by wiping with a longer stroke parallel to the seam.
5. The filled joint is left to set and dry at 105° F./30% RH for 24 hours and then removed for tensile strength testing.
6. Each two inch strip is removed from the hold down frame and clamped in a Tinius Olsen universal testing machine. The clamping jig used is such that when the two halves of the joints are pulled apart the force is applied 100% in the vertical direction. The machine pulls the samples apart at a rate of 0.5 mm/min., and records the highest force required to break the joint (pounds force).

The procedure for conducting the shrinkage test is as follows:

A flat edge is placed across the joint. The distance the surface of the dried compound extends below the edge of the flat edge is measured in millimeters and is termed "shrinkage".

It can be seen that the shorter and longer set time joint compounds of this invention exhibited relatively high flexural strength (75 and 65 lbs. per lineal foot), minimum shrinkage ($\leq 2$ mm each), and substantially no visible cracking under very hot and dry surrounding atmospheric conditions. Conversely, a Solid Products, Inc. joint compound, such as Fibre Joint or the like, exhibited relatively low flexural strength (26-30 lbs. per lineal foot), and relatively (high shrinkage ($>2.5$ mm).

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

1. A dry mix-type, drywall panel joint compound, which comprises (a) from about 80 to 98 weight % of a fine plaster comprising stucco which is applied to a joint formed between adjacent drywall panels in the plastic state to form a hardened material; (b) from about 0.5 to 6 weight % of a material comprising an alkyl cellulose which imparts internal strength and workability to the joint compound; (c) from about 0.5 to 10 weight % of perlite for retaining water and inhibiting shrinkage of the joint compound within the joint formed between adjacent drywall panels; and (d) from about 0.01 to 5 weight % of a set time retarding agent, all of the weight % of (a) through (d) being based on the total weight of the joint compound, said dry mix-type joint compound when applied within the joint formed between adjacent drywall panels, exhibiting a high flexural strength of at least about 50 pounds/linear inch, limited shrinkage, and substantially no visible cracking at hot and dry surrounding atmospheric conditions of at least about 105 degrees F. and 30% relative humidity.

2. The compound of claim 1, wherein the set time retarding agent comprising substituted-butanoic acid.

3. The compound of claim 2, wherein the substituted-butanoic acid is an N-poly(oxymethylene)-amino butanoic acid.

4. The compound of claim 1, wherein the set time retarding agent is a salt of butanoic acid.

5. The compound of claim 1, wherein said alkyl cellulose material comprises methyl hydroxy ethyl cellulose or methyl cellulose.

6. The compound of claim 1, wherein the material for retaining water and inhibiting shrinkage of the joint compound within the joint formed between adjacent drywall panels comprises perlite.

7. The compound of claim 6, wherein the perlite has a high surface area of at least about 1 m$^2$/g.

8. The compound of claim 1, wherein the set time is up to about 180 minutes.

9. A dry mix-type, drywall panel joint compound, which comprises from about 40 to 60 weight % of (a) a fine plaster comprising stucco; from about 0.25 to 3 weight % of (b) a material which imparts internal strength and workability to the joint compound comprising an alkyl cellulose; from about 0.25 to 5 weight % of (c) perlite; from about 0.005 to 2.5 weight % of (d) a set time retarding agent; and (e) from about 35 to 50 weight % of water, all of the weight % of (a) through (e) being based on the total weight of the joint compound.

10. The compound of claim 1, which comprises from about 90 to 96 weight % of (a) stucco; from about 1 to 5 weight % of (b) an alkyl cellulose; from about 1 to 5 weight % of (c) perlite; and from about 0.05 to 1 weight % of (d) a set time agent, all of weight % of (a) through (d) being based on the total weight of the joint compound.

11. The compound of claim 1, which further comprises 0.1 to 8 weight % of mica and, 0.1 to 4 weight % of bentonite clay 0.1 to 8 weight % of vinyl alcohol and/or vinyl alcohol, and and 0.01 to 5 weight % of calcium hydroxide.

12. The compound of claim 4, wherein said salt of butanoic acid comprises a calcium salt of butanoic acid.

13. The compound of claim 1, further characterized in that it undergoes shrinkage of not more than about 2 mm.

14. The compound of claim 1, which further comprises from about 0.1 to 3 weight % of (f) bentonite clay; from about 0.1 to 5 weight % of (g) vinyl acetate and/or vinyl alcohol; from about 0.1 to 1 weight % of (h) calcium hydroxide, all of weight % of (a) thru (h) being based on the total weight of the joint compound.

15. The compound of claim 14 wherein the set time retarding agent is a salt of butanoic acid.

16. A joint compound for application within the joint formed between adjacent drywall panels, which comprises (a) from about 80 to 98 weight % of a fine plaster comprising stucco which is applied to a joint formed between adjacent drywall panels in the plastic state to form a hardened material; (b) from about 0.5 to 6 weight % of a material comprising an alkyl cellulose which imparts internal strength and workability to the joint compound; (c) from about 0.5 to 10 weight % of perlite for retaining water and inhibiting shrinkage of the joint compound within the joint formed between adjacent drywall panels; and (d) from about 0.01 to 5 weight % of a set time retarding agent, all of the weight % of (a) through (d) being based on the total weight of the joint compound, said dry mix-type joint compound when applied within the joint formed between adjacent drywall panels, exhibiting a high flexural strength of at least about 50 pounds/linear inch, limited shrinkage, and substantially no visible cracking at hot and dry surrounding atmospheric conditions of at least about 105 degrees F. and 30% relative humidity.

17. The compound of claim 16, wherein the set time retarding agent comprises substituted-butanoic acid.

18. The compound of claim 17, wherein the substituted-butanoic acid is an N-poly(oxymethylene)-amino butanoic acid.

19. The compound of claim 16, wherein the alkyl cellulose material comprises methyl hydroxy ethyl cellulose or methyl cellulose.

20. The compound of claim 16, wherein the perlite has a high surface area of at least about 1.0 m$^2$/g.

21. A joint compound for application within a joint formed between adjacent drywall panels, which comprises from about 40 to 60 weight % of (a) a fine plaster comprising stucco; from about 0.25 to 3 weight % of (b) a material which imparts internal strength and workability to the joint compound comprising an alkyl cellulose; from about 0.25 to 5 weight % of (c) perlite; from about 0.005 to 2.5 weight % of (d) a set time retarding agent; and from about 35 to 50 weight % of water, all of the weight % of (a) through (e) being based on the total weight of the joint compound.

22. The compound of claim 16, which comprises from about 90 to 96 weight % of (a) stucco; from about 1 to 5 weight % of (b) an alkyl cellulose; from about 1 to 5 weight % of (c) perlite; and from about 0.05 to 1 weight % of (d) a set time agent, all of weight % of (a) through (d) being based on the total weight of the joint compound.

23. The compound of claim 16, which further comprises 0.1 to 8 weight % of mica and, 0.1 to 4 weight % of bentonite clay, 0.1 to 8 weight % of vinyl alcohol and/or vinyl acetate, and 0.01 to 5 weight % of calcium hydroxide.

24. The compound of claim 16, further characterized in that it undergoes shrinkage of not more than about 2 mm.

25. The compound of claim 16, which further comprises from about 0.1 to 3 weight % of (f) bentonite clay; from about 0.1 to 5 weight % of (g) vinyl acetate and/or vinyl alcohol; from about 0.1 to 1 weight % of (h) calcium hydroxide, all of weight % of (a) thru (h) being based on the total weight of the joint compound.

26. The compound of claim 16, wherein the substituted-butanoic acid is an N-poly(oxymethylene)-amino butanoic acid.

* * * * *